United States Patent [19]

Kanterovitch

[11] Patent Number: 5,509,561
[45] Date of Patent: Apr. 23, 1996

[54] CONTAINERS AND METHOD OF MAKING SAME

[75] Inventor: Dan Kanterovitch, Petah Tikva, Israel

[73] Assignee: Scitex Corporation Ltd., Herzlia Bet, Israel

[21] Appl. No.: 3,047

[22] Filed: Jan. 11, 1993

[30] Foreign Application Priority Data

Mar. 19, 1992 [IL] Israel .................................. 101296

[51] Int. Cl.⁶ .................................................. B65D 43/16
[52] U.S. Cl. .................... 220/428; 220/4.32; 220/671; 206/389; 206/409; 206/455
[58] Field of Search .............................. 354/275; 355/75; 242/71.1, 55.53; 206/407, 389, 455, 409; 220/337, 339, 4.32, 4.24, 4.22, 213, 671, 4.28

[56] References Cited

U.S. PATENT DOCUMENTS

| | | | |
|---|---|---|---|
| 2,752,106 | 6/1956 | Thompson | 242/55.53 |
| 3,425,587 | 2/1969 | Duross, Jr. | 220/337 |
| 4,034,926 | 7/1977 | Wegner | 220/4.24 |
| 4,232,852 | 9/1980 | Neuhold | 242/71.1 |
| 4,244,254 | 1/1981 | Fish | 206/407 |
| 4,903,833 | 2/1990 | Beery | 206/407 |
| 4,956,908 | 9/1990 | Morse et al. | 242/71.1 |
| 4,992,627 | 2/1991 | Mullaney | 220/339 |
| 5,053,795 | 10/1991 | Wyman | 206/409 |
| 5,083,155 | 1/1992 | Kataoka et al. | 242/71.1 |
| 5,131,538 | 7/1992 | Thibodeau | 206/407 |

FOREIGN PATENT DOCUMENTS

| | | | |
|---|---|---|---|
| 653795 | 9/1964 | France | 354/275 |
| 443641 | 3/1936 | United Kingdom | 220/337 |

*Primary Examiner*—Stephen J. Castellano
*Attorney, Agent, or Firm*—Benjamin J. Barish

[57] ABSTRACT

A container includes bottom and side walls defined by a first longitudinally-extending channel member open at the top, a pivotal lid defined by a second longitudinally-extending channel member open at the bottom and pivotally mounted to one longitudinal edge of the first channel member, and end walls defined by a pair of end plates having slots on their inner faces receiving the ends of the first channel member, and recesses on their inner faces receiving the ends of the second channel member and permitting it to pivot with respect to the first channel member.

12 Claims, 5 Drawing Sheets

CONTAINERS AND METHOD OF MAKING SAME

FIELD AND BACKGROUND OF THE INVENTION

The present invention relates to containers, and also to a method of making such containers. The invention is particularly useful in making cassette-type containers for holding spools of negatives produced in laser plotters. The invention is therefore described below with respect to such an application, but it will be appreciated that the invention could advantageously be used in other types of containers.

Spools of negatives produced by laser plotters vary in width according to each particular application. The containers for holding such spools are therefore constructed of different widths according to the length of the spool to be received in the container. This increases the cost of producing such containers and also of maintaining an inventory for the different size spools. Such containers are generally made of sheet material, e.g., metal or plastic, formed with appropriate bends, welds, etc., according to the configuration required for the particular spool. The manufacture of such conventional-type containers is therefore not susceptible to volume, low-cost production.

OBJECTS AND BRIEF SUMMARY OF THE INVENTION

An object of the present invention is to provide a container of a structure which permits containers of a large number of different lengths, to be produced and assembled in volume and at low cost.

Another object of the invention is to provide a method of making such a container.

According to the present invention, there is provided a container including bottom, side and end walls closed by a pivotal lid, characterized in that: the bottom and side walls are defined by a first longitudinally-extending channel member open at the top; the pivotal lid is defined by a second longitudinally-extending channel member open at the bottom and having one longitudinal edge pivotally mounted to one longitudinal edge of the first channel member; the end walls are defined by a pair of end plates formed with slots on their inner faces, inwardly of their outer peripheries, of complementary shape as the first channel member and of a width equal to the thickness of the first channel member, the slots receiving the ends of the first channel member; and the end walls also have recesses on their inner faces receiving the ends of the second channel member permitting the second channel member to pivot with respect to the first channel member.

As will be described more particularly below, such a construction permits the two channel members to be produced in continuous lengths by extrusion, and then cut to size according to the length of the container to be produced. The containers may be easily assembled by frictionally-fitting the ends of the two channel members into the slots of the end plates, preferably by using an adhesive to fix the channel members to the end plates.

According to further features in the described preferred embodiment, one longitudinal edge of the first channel member is formed with a longitudinally-extending slot of spiral cross-section, and one longitudinal edge of the second channel member is of complementary spiral configuration in cross-section so as to be received in said slot of the first channel member and to permit the second channel member to pivot with respect to said first channel member. These features facilitate the assembly of the container by edge-inserting the second channel member into the first channel member.

According to further features in the described preferred embodiments, the recesses in the inner faces of the end plates define first and second shoulders engageable with the second channel member to fix the closed and open positions, respectively, of the pivotal second channel member.

According to still further features in the described preferred embodiment, the longitudinal edge of the first channel member opposite to its edge pivotally mounting the second channel member is formed with a longitudinally-extending anchoring extension received within complementary-shaped anchoring slots formed in the inner faces of the end plates to firmly anchor the first channel member against movement with respect to the end plates.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
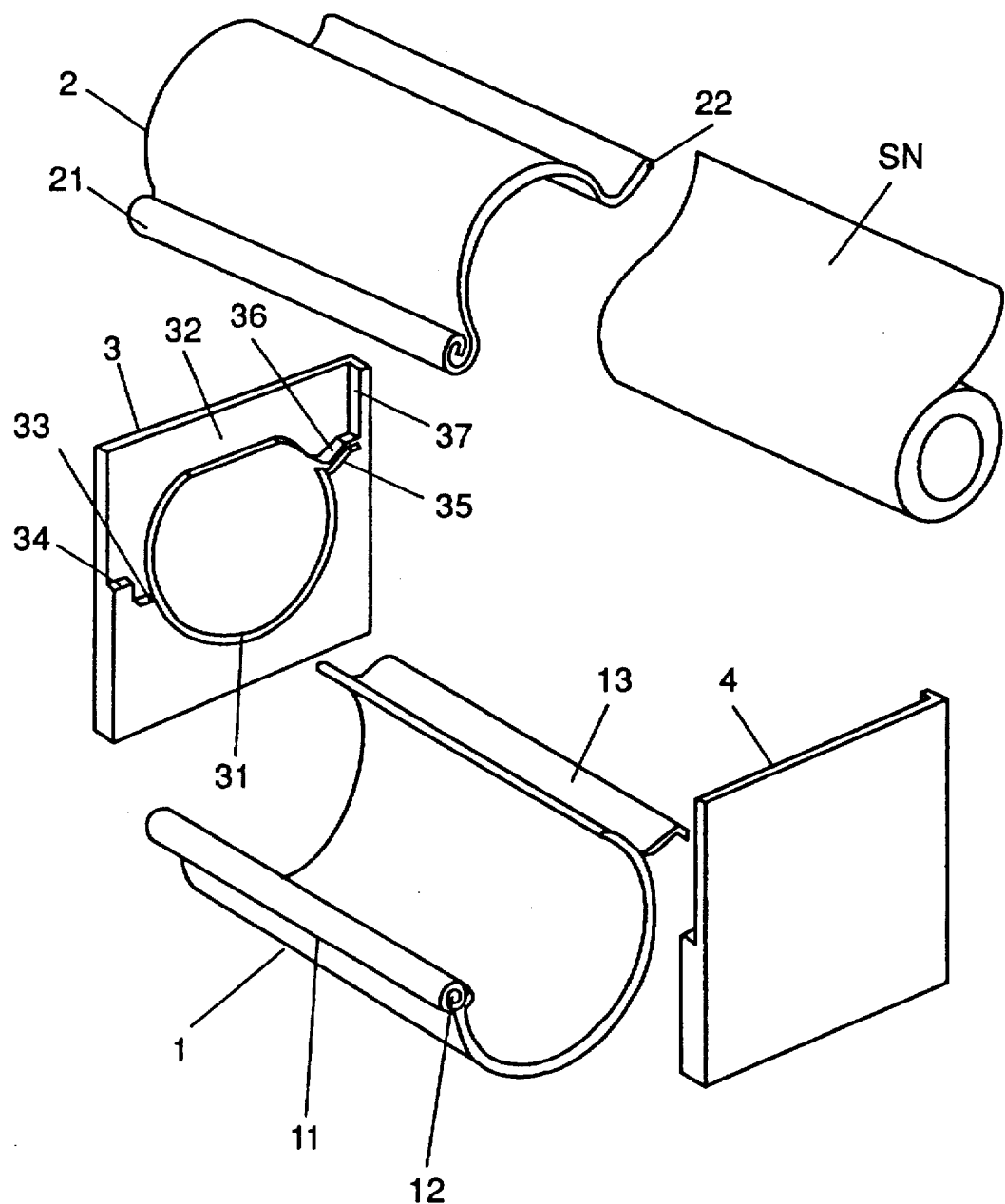
FIG. 1 is a three-dimensional exploded view illustrating the parts of one form of container constructed in accordance with the present invention.
Figure 2:
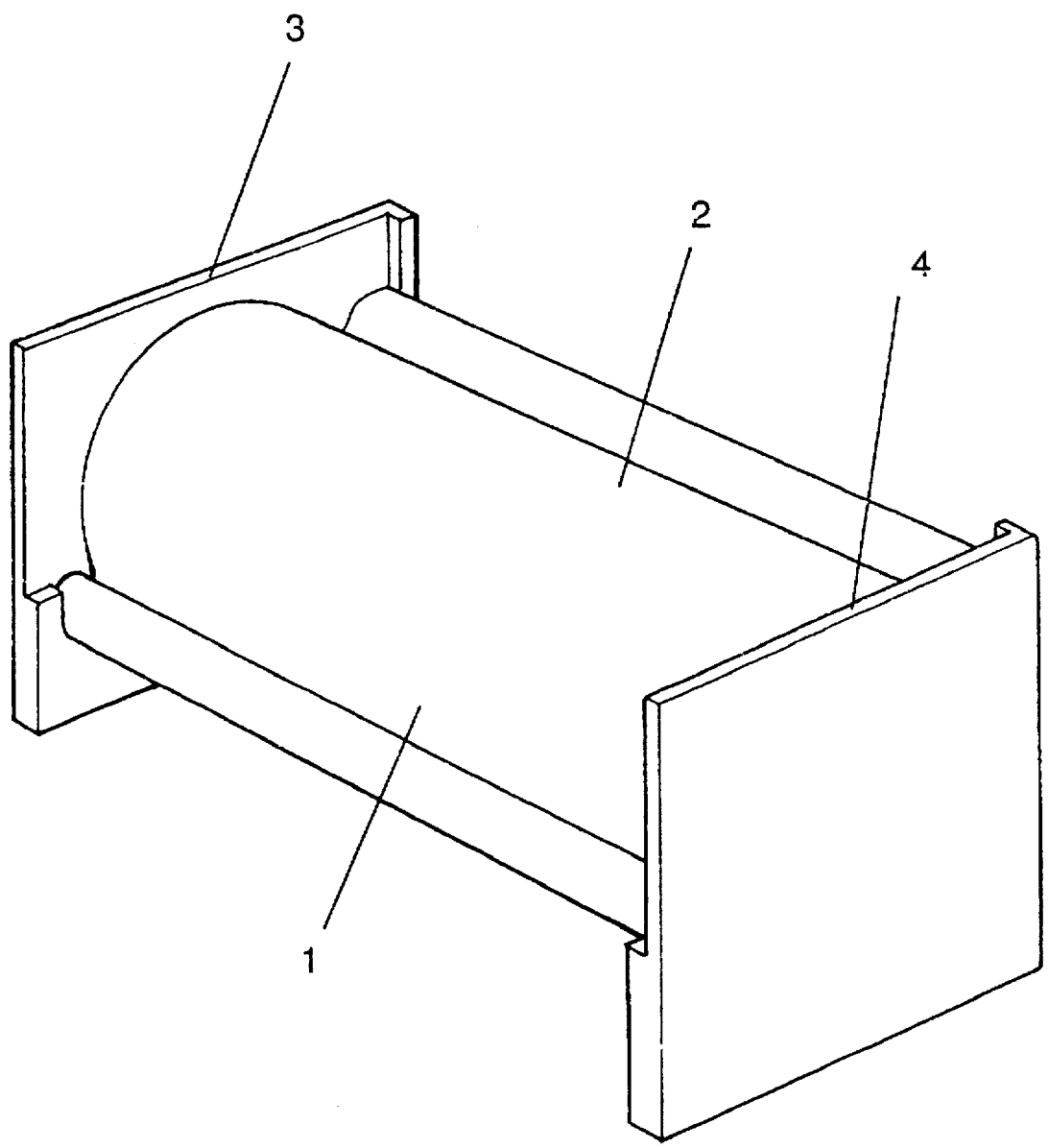
FIG. 2 is a three-dimensional view of the container of FIG. 1 in assembled condition.

The container illustrated in FIGS. 1 and 2 is particularly useful as a cassette for holding a spool of negatives, generally designated SN, produced by laser plotters. It is to be appreciated, however, that this is but one example of the type of container that may be produced according to the present invention.

The container illustrated in FIGS. 1 and 2 is made of four elements, namely: a lower channel member 1, an upper channel member 2, and a pair of flat plates 3 and 4 at the opposite ends of the two channel members. The lower channel member 1 serves as the bottom and side walls of the container to be constructed; the upper channel member 2 serves as a pivotal lid; and the two end plates 3 and 4 serve as the end walls of the container to be constructed.

In the embodiment illustrated in FIGS. 1 and 2, the two channel members 1 and 2 are each of semi-cylindrical configuration. The produced container is therefore of cylindrical configuration with flat end walls defined by the end plates 3 and 4.

As shown particularly in FIG. 1, the lower channel member 1, of semi-cylindrical configuration, is open at the top. It includes, at one longitudinally-extending edge, an extension 11 formed with a slot 12 of spiral configuration in cross-section. As will be described below, slot 12 is used for pivotally mounting channel member 2 to channel member 1. Channel member 1 is formed at the opposite edge with another longitudinally-extending extension 13 of generally S-configuration. This extension is received within a complementary-shaped slot in each of the two end plates 3, 4, for anchoring channel member 1 to the two end plates.

Channel member 2, which serves as the pivotal lid in the container, is also of semi-cylindrical configuration but is open at the bottom. It is formed at one edge with a longitudinally-extending extension 21 of spiral configuration, complementary to the spiral slot 12 in channel member 1, so as to be receivable within that slot and thereby to pivotally mount channel member 2 to channel member 1. The opposite edge of channel member 2 is formed with an extension 22, also of generally S-configuration, similar to the S-configuration of the anchoring extension 13 formed in channel member 1. Extension 22 in channel member 2 serves as a fingerpiece for pivoting channel member 2 in order to open and close the container.

The two end plates 3 and 4 are of the same construction. This construction is shown particularly in FIG. 1 with respect to end plate 3.

Thus, end plate 3 is of square configuration. Its inner surface is formed with a slot 31, inwardly of the outer periphery of plate 3. Slot 31 is of complementary shape as channel member 1, and is of a width equal to the thickness of channel member 1. In this case, slot 31 is of semi-circular configuration for receiving the semi-cylindrical channel member 1. The inner surface of end plate 3 is also formed with a recess 32 for receiving the semi-cylindrical channel member 2 and for permitting its pivotal movement with respect to channel member 1. One end of recess 32 is extended downwardly towards the respective end of slot 31 as shown at 33 to accommodate the extension 11 of channel member 1 formed with the spiral recess 12. The same end of recess 32 is formed with a shoulder 34 which serves as a limit, engageable by the upper channel member 2, to fix the open position of that channel member.

The opposite end of the semi-circular slot 31 is formed with an extension 35 of generally S-configuration, corresponding to the S-configuration of anchoring extension 13 of channel member 1, so as to receive that extension and to firmly anchor the respective end of channel member 1 to end plate. The respective end of recess 32 is also formed with a shoulder 36 of generally S-configuration to engage the fingerpiece extension 22 of channel member 2 and thereby to fix the closed position of that channel member.

Recess 32 terminates short of the respective side edge of end plate 3 to define an unrecessed margin 37. This margin serves as a light barrier against the entry of light from the ends of the container, as described more particularly below.

The two channel members 1 and 2 may be produced by extrusion in continuous lengths and then cut to size according to the length of the container to be produced. Any suitable material, plastic or metal, may be used for this purpose.

To assemble a container, one end of channel member 1 is press-fitted into slot 31 of one end plate (e.g., 3) with extension 11 received within the recess portion 33 of the end plate, and anchoring extension 13 received within slot 35 of the end plate. Channel member 2 is then applied by inserting its spiral extension 21 into the spiral slot 12 of channel member 1, and sliding channel member 2 along the complete length of channel member 1 until the respective end of channel member 2 is received within recess 32 of end plate 3. The second end plate (e.g., 4) is then applied to the opposite ends of the two channel members 1 and 2.

While a friction fit may be sufficient in many cases, particularly for small sized containers, to hold the parts together, it is preferred to use an adhesive at the ends of channel member 1 to firmly fix that channel member to the two end plates 3 and 4.

When the parts are so assembled, channel member 1 serves as the bottom and side walls of the container, whereas channel member 2 serves as a lid which, by its spiral extension 21 received in spiral slot 12 of channel member 1, is pivotal to either a closed position or an open position. In the closed position, extension 22 of channel member 2 rests against the S-shaped sections 36 of the recesses 32 in the two end plates 3 and 4; the end sections 37 of the two end plates thereby serve as light barriers against the entry of light via the ends of the two channel members. The open position of pivotal channel member 2 is determined by the engagement of the ends of the channel member with shoulders 34 formed in the recesses 32 of the two end plates 3, 4. The flat bottom edges of the two end plates stably support the container on a flat horizontal surface.

It will thus be seen that containers of the construction illustrated in FIGS. 1 and 2 may be produced and assembled in volume, at low cost, and of different lengths according to the requirements for any particular application.

Figure 3:
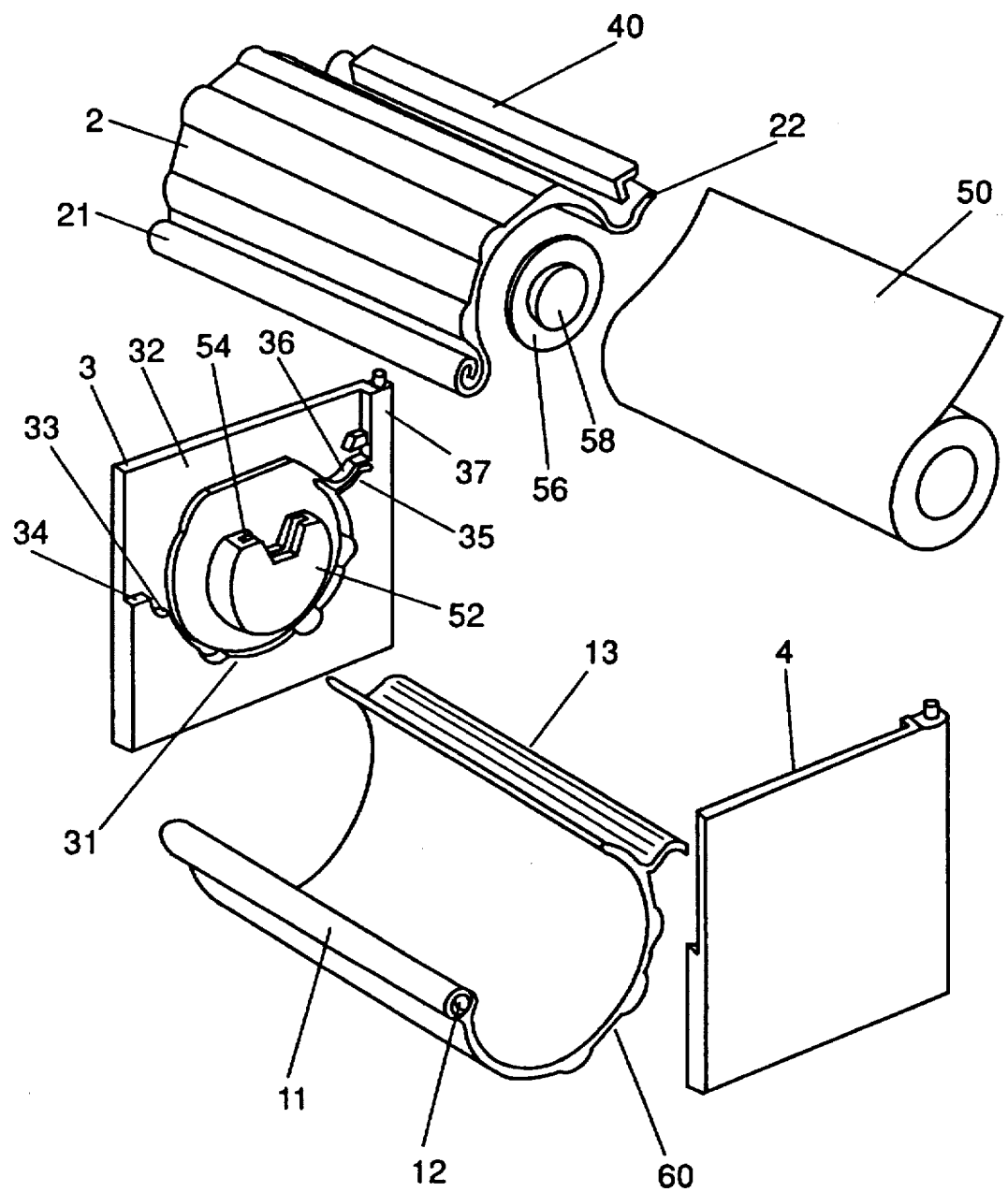
FIG. 3 is an exploded three-dimensional view illustrating the parts of a second form of container constructed in accordance with the present invention and including an arrangement for rotatably mounting a spool in the container.
Figure 4:
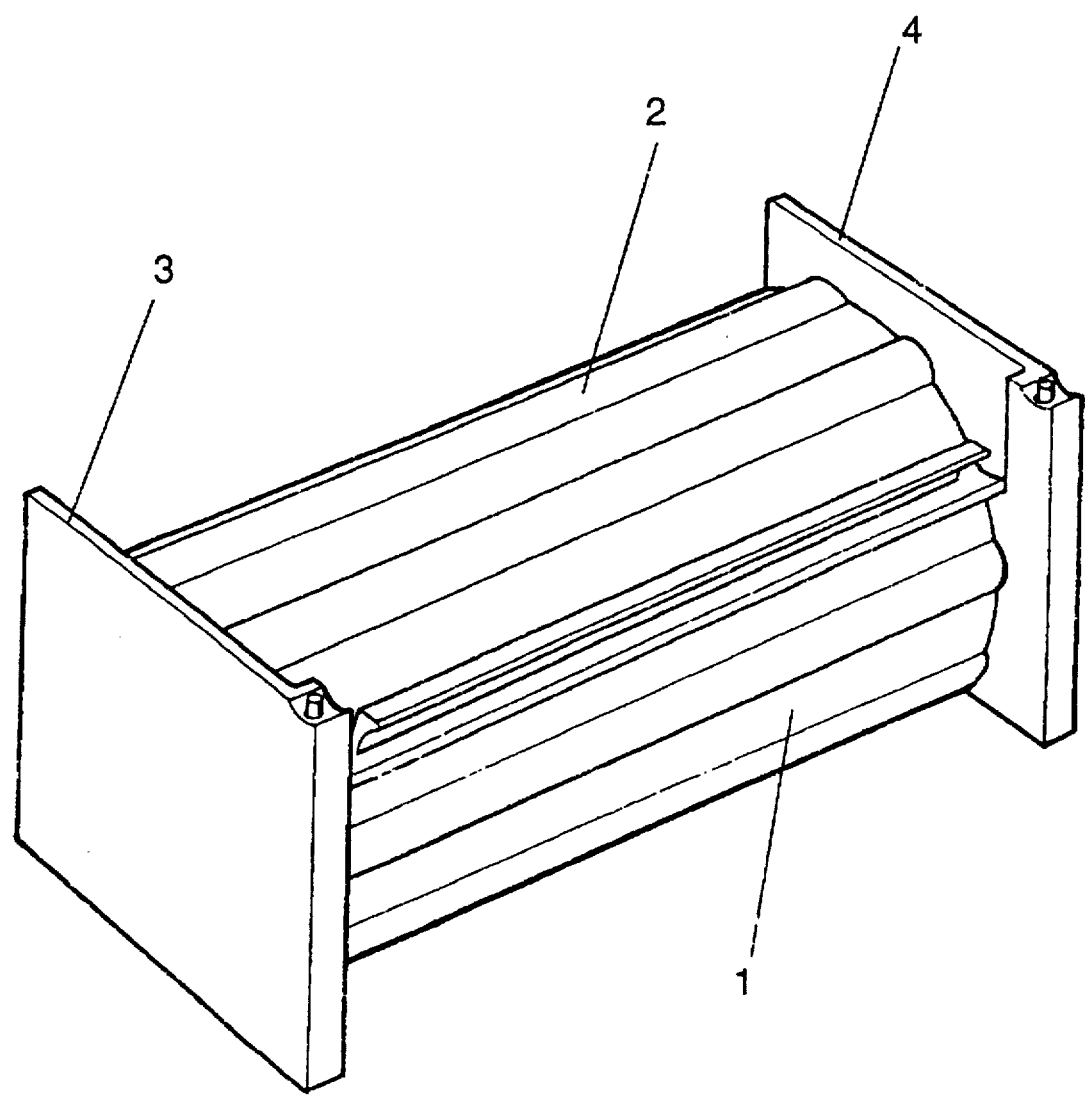
FIG. 4 is a three-dimensional view of the container of FIG. 3 in its assembled condition.

The container illustrated in FIGS. 3 and 4 is of a construction very similar to that of FIGS. 1 and 2 but includes additional features. To facilitate understanding, those parts in the container of FIGS. 3 and 4 of generally the same structure as in FIGS. 1 and 2 are identified by the same reference numerals.

One additional feature included in the construction of the container of FIGS. 3 and 4 is that the longitudinal edge of the channel member 2, serving as the pivotal lid of the container, is formed with a longitudinally-extending, elastic, retainer extension 40 along the edge thereof opposite to the edge pivotally mounting it to the fixed channel member 1. This extension 40 is snappable over a rib 42 defined by the recess 32 of each of the end plates 3, 4, and thereby releasably retains the pivotal channel member 2 in its closed position with respect to the fixed channel member 1.

A second feature included in the container construction of FIGS. 3 and 4 is that the two end plates 3, 4 are formed with mounting means for rotatably mounting a spool 50 within the container. Thus, each of the two end plates 3, 4 is internally formed on its inner surface with a disc-shaped projection 52 including a V-shaped slot 54 on its upper surface for receiving a disc 56 formed with a central spindle 58 for rotatably mounting the respective end of the spool 50.

A third feature included in the container construction of FIGS. 3 and 4 is that the two channel members 1 and 2 are formed on their outer surfaces with a plurality of longitudinally-extending, circumferentially-spaced strengthening ribs 60. Since the two channel members may be produced in continuous lengths by extrusion and then cut to size, it is only necessary to suitably design the extrusion die in order to provide these strengthening ribs.

Figure 5:
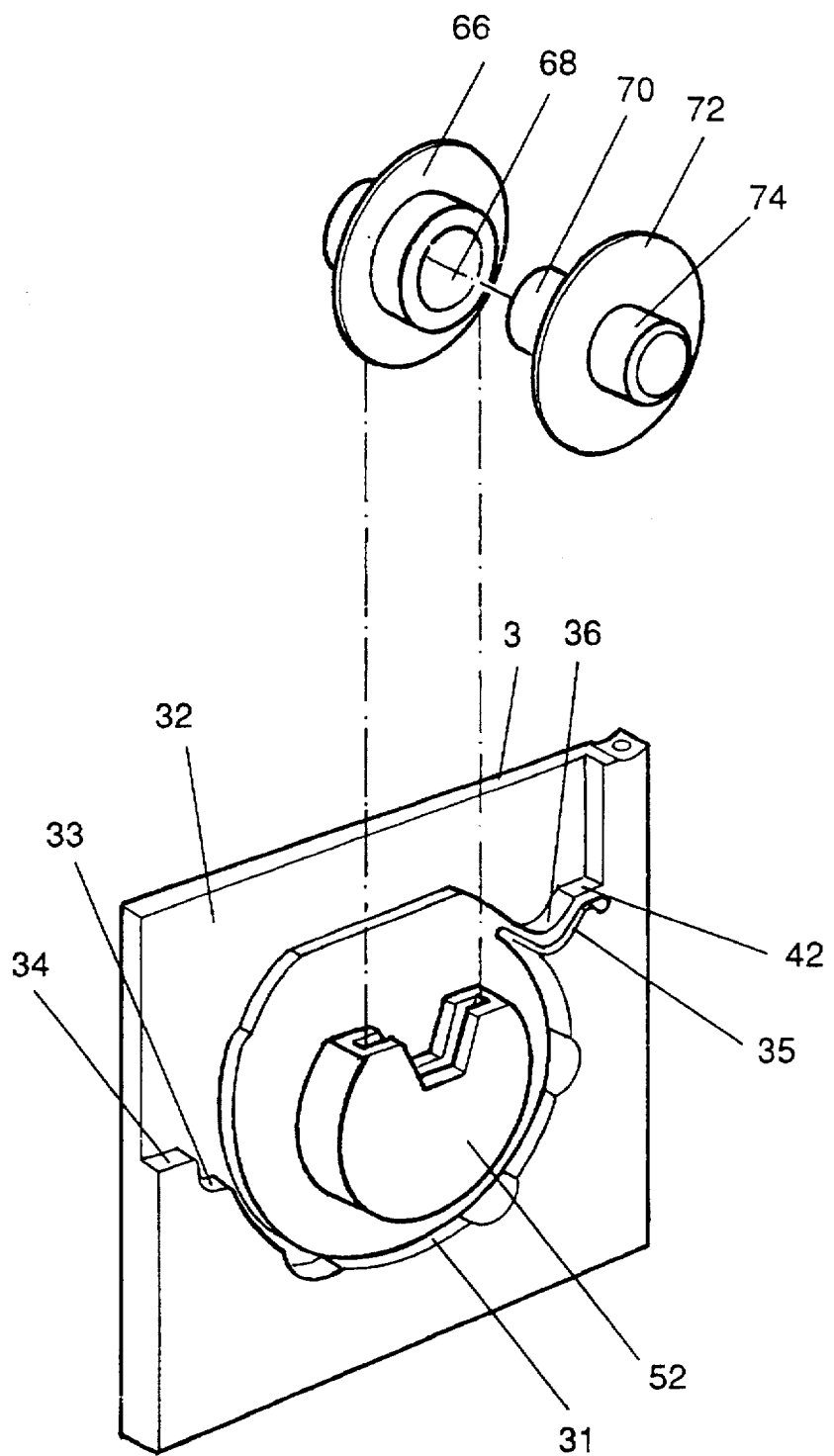
FIG. 5 is a three-dimensional view illustrating a modification in the arrangement for rotatably mounting the spool in the container of FIGS. 3 and 4.

FIG. 5 illustrates a modification in the manner of rotatably mounting the spool 50 in the container of FIGS. 3 and 4. In this modification, the disc 66 received within the V-shaped slot 54 in the projection 52 of each of the end plates 3, 4, is formed with a bore 68 therethrough receiving a stem 70 formed on one side of another disc 72, the opposite side of the latter disc being integrally formed with a spindle 74 for receiving the respective end of the spool 50.

While the invention has been described with respect to several preferred embodiments, it will be appreciated that these are set forth merely for purposes of example, and that many other variations, modifications and applications of the invention may be made.

What is claimed is:

1. A container including bottom, side and end walls and an open top closed by a pivotal lid, characterized in that:

said bottom and side walls are defined by a first longitudinally-extending channel member of semi-cylindrical configuration open at the top;

said pivotal lid is defined by a second longitudinally-extending channel member of complementary semi-cylindrical configuration open at the bottom and having one longitudinal edge pivotally mounted to one longitudinal edge of said first channel member;

said end walls are defined by a pair of end plates formed with semi-circular slots on their inner faces, inwardly of their outer peripheries, of complementary shape as said first channel member, and of a width equal to the thickness of said first channel member, said slots receiving the ends of said first channel member;

said end plates are also formed with recesses on their inner faces receiving the ends of said second channel member and of a configuration to permit said second channel member to pivot with respect to said first channel member;

and a longitudinal edge of the first channel member, opposite to said one edge thereof pivotally mounting the second channel member, is formed with a longitudinally-extending anchoring extension received within complementary-shaped anchoring slots formed in the inner faces of said end plates to firmly anchor the first channel member against movement with respect to said end plates.

2. A container including bottom, side and end walls and an open top closed by a pivotal lid, characterized in that:

said bottom and side walls are defined by a first longitudinally-extending channel member open at the top;

said pivotal lid is defined by a second longitudinally-extending channel member open at the bottom and having one longitudinal edge pivotally mounted to one longitudinal edge of said first channel member;

said end walls are defined by a pair of end plates formed with slots on their inner faces, inwardly of their outer peripheries, of complementary shape as said first channel member, and of a width equal to the thickness of said first channel member, said slots receiving the ends of said first channel member;

said end walls are formed with recesses on their inner faces receiving the ends of said second channel member and of a configuration to permit said second channel member to pivot with respect to said first channel member;

and a longitudinal edge of the first channel member, opposite to said one edge thereof pivotally mounting the second channel member, is formed with a longitudinally-extending anchoring extension received within complementary-shaped anchoring slots formed in the inner faces of said end plates to firmly anchor the first channel member against movement with respect to said end plates;

said one longitudinal edge of the first channel member being formed with a longitudinally-extending slot of spiral cross-section, and said one longitudinal edge of the second channel member being of complementary spiral configuration in cross-section so as to be received in said slot of the first channel member and to permit the second channel member to pivot with respect to said first channel member.

3. A container including bottom, side and end walls and an open top closed by a pivotal lid, characterized in that:

said bottom and side walls are defined by a first longitudinally-extending channel member open at the top;

said pivotal lid is defined by a second longitudinally-extending channel member open at the bottom and having one longitudinal edge pivotally mounted to one longitudinal edge of said first channel member;

said end walls are defined by a pair of end plates formed with slots on their inner faces, inwardly of their outer peripheries, of complementary shape as said first channel member, and of a width equal to the thickness of said first channel member, said slots receiving the ends of said first channel member;

said end walls are formed with recesses on their inner faces receiving the ends of said second channel member and of a configuration to permit said second channel member to pivot with respect to said first channel member;

and a longitudinal edge of the first channel member, opposite to said one edge thereof pivotally mounting the second channel member, is formed with a longitudinally-extending anchoring extension received within complementary-shaped anchoring slots formed in the inner faces of said end plates to firmly anchor the first channel member against movement with respect to said end plates;

said recesses in the inner faces of the end plates defining first shoulders engageable with the second channel member to limit the closed position of the second channel member;

said recesses in the inner faces of the end plates defining second shoulders engageable with the second channel member to limit the open position of the second channel member.

4. A container including bottom, side and end walls and an open top closed by a pivotal lid, characterized in that:

said bottom and side walls are defined by a first longitudinally-extending channel member open at the top;

said pivotal lid is defined by a second longitudinally-extending channel member open at the bottom and having one longitudinal edge pivotally mounted to one longitudinal edge of said first channel member;

said end walls are defined by a pair of end plates formed with slots on their inner faces, inwardly of their outer peripheries, of complementary shape as said first channel member, and of a width equal to the thickness of said first channel member, said slots receiving the end of said first channel member;

said end walls are formed with recesses on their inner faces receiving the ends of said second channel member and of a configuration to permit said second channel member to pivot with respect to said first channel member;

and a longitudinal edge of the first channel member, opposite to said one edge thereof pivotally mounting the second channel member, is formed with a longitudinally-extending anchoring extension received within complementary-shaped anchoring slots formed in the inner faces of said end plates to firmly anchor the first channel member against movement with respect to said end plates;

a longitudinal edge of the second channel member opposite to said one edge pivotally mounting the second channel member to the first channel member being formed with a longitudinally-extending, elastic, retainer extension snappable over a rib formed in said recess in each of said end plates for releasably retaining the second channel member in its closed position.

5. A container including bottom, side and end walls and an open top closed by a pivotal lid, characterized in that:

said bottom and side walls are defined by a first longitudinally-extending channel member open at the top;

said pivotal lid is defined by a second longitudinally-extending channel member open at the bottom and having one longitudinal edge pivotally mounted to one longitudinal edge of said first channel member;

said end walls are defined by a pair of end plates formed with slots on their inner faces, inwardly of their outer peripheries, of complementary shape as said first channel member, and of a width equal to the thickness of said first channel member, said slots receiving the ends of said first channel member;

said end walls are formed with recesses on their inner faces receiving the ends of said second channel member and of a configuration to permit said second channel member to pivot with respect to said first channel member;

and a longitudinal edge of the first channel member, opposite to said one edge thereof pivotally mounting the second channel member, is formed with a longitudinally-extending anchoring extension received within complementary-shaped anchoring slots formed in the inner faces of said end plates to firmly anchor the first channel member against movement with respect to said end plates;

said end plates being integrally formed with mounting means for rotatably mounting a spool within the container;

said mounting means comprising a projection integrally formed on the inner face of each end plate, each of said projections including a V-shaped slot for receiving a disc rotatably mounting one side of the spool.

6. A container including bottom, side and end walls and an open top closed by a pivotal lid;

said bottom and side walls being defined by a first longitudinally-extending, semi-cylindrical channel member open at the top;

said pivotal lid being defined by a second longitudinally-extending channel member of complementary semi-cylindrical configuration open at the bottom and having one longitudinal edge pivotally mounted to one longitudinal edge of said first channel member;

said end walls being defined by a pair of end plates formed with slots on their inner faces of, spaced inwardly of their outer peripheries, of semi-circular shape, and of a width equal to the thickness of said first channel member, so as to fixedly receive the opposite ends of said first channel member;

said end walls also being formed with recesses on their inner faces receiving the ends of said second channel member permitting said second channel member to pivot with respect to said first channel member.

7. The container according to claim 6, wherein said one longitudinal edge of the first channel member is formed with a longitudinally-extending slot of spiral cross-section, and said one longitudinal edge of the second channel member is of complementary spiral configuration in cross-section so as to be received in said slot of the first channel member and to permit the second channel member to pivot with respect to said first channel member.

8. The container according to claim 6, wherein said recesses in the inner faces of the end plates define first shoulders engageable with the second channel member to limit the closed position of the second channel member; and second shoulders engageable with the second channel member to limit the open position of the second channel member.

9. The container according to claim 6, wherein a longitudinal edge of the first channel member opposite to said one edge thereof pivotally mounting the second channel member is formed with a longitudinally-extending anchoring extension received within complementary-shaped anchoring slots formed in the inner faces of said end plates to firmly anchor the first channel member against movement with respect to said end plates.

10. The container according to claim 6, wherein a longitudinally-extending edge of the second channel member, opposite to that received in the spiral cross-section slot of the first channel member, is formed with a longitudinally-extending extension to serve as a fingerpiece for facilitating pivotting the second channel member with respect to the first channel member.

11. The container according to claim 6, wherein said end plates have flat bottom edges which extend below the outer surface of the first channel member, thereby serving as flat supporting surfaces for the container.

12. The container according to claim 6, wherein a longitudinal edge of the second channel member opposite to said one edge pivotally mounting the second channel member to the first channel member is formed with a longitudinally-extending, elastic, retainer extension snappable over a rib formed in said recess in each of said end plates for releasably retaining the second channel member in its closed position.

\* \* \* \* \*